United States Patent [19]
Banzhaf et al.

[11] Patent Number: 5,215,044
[45] Date of Patent: Jun. 1, 1993

[54] COOLING SYSTEM FOR A VEHICLE HAVING AN INTERNAL-COMBUSTION ENGINE

[75] Inventors: Matthias Banzhaf, Leonberg; Wilhelm Baruschke, Wangen; Juergen Barwig, Illingen; Dieter Bauer, Stuttgart; Jochen Eitel, Bissingen; Kurt Hauser, Stuttgart; Werner Helms, Esslingen; Karl Lochmahr, Vaihingen, all of Fed. Rep. of Germany

[73] Assignee: BEHR GmbH & Co., Stuttgart, Fed. Rep. of Germany

[21] Appl. No.: 830,843

[22] Filed: Feb. 4, 1992

[30] Foreign Application Priority Data

Feb. 11, 1991 [DE] Fed. Rep. of Germany ....... 4104093

[51] Int. Cl.$^5$ .............................................. F01P 3/00
[52] U.S. Cl. ........................... 123/41.29; 123/41.05; 123/41.1; 123/41.31; 123/41.33
[58] Field of Search .............. 124/41.01, 41.02, 41.1, 124/41.29, 41.31, 41.33, 41.51, 41.05, 41.06, 41.14

[56] References Cited

U.S. PATENT DOCUMENTS

| | | | |
|---|---|---|---|
| 3,498,539 | 3/1970 | Boehmfeld et al. | 123/41.14 |
| 4,413,596 | 11/1983 | Hirayama | 123/41.1 |
| 4,434,749 | 3/1984 | Morita et al. | 123/41.02 |
| 4,539,943 | 9/1985 | Tsuchikawa et al. | 123/41.05 |
| 4,556,171 | 12/1985 | Fukami et al. | 123/41.14 |
| 4,726,325 | 2/1988 | Itakura | 123/41.1 |
| 4,893,590 | 1/1990 | Kashimura et al. | 123/41.31 |

FOREIGN PATENT DOCUMENTS

| | | |
|---|---|---|
| 0156078B1 | 12/1987 | European Pat. Off. |
| 1207710 | 12/1965 | Fed. Rep. of Germany |
| 1476370 | 11/1969 | Fed. Rep. of Germany |
| 7045215 | 9/1971 | Fed. Rep. of Germany |
| 2235183 | 2/1974 | Fed. Rep. of Germany |
| 2435004B2 | 2/1976 | Fed. Rep. of Germany |
| 2740918A1 | 3/1979 | Fed. Rep. of Germany |
| 3018076A1 | 11/1981 | Fed. Rep. of Germany |
| 3120507A1 | 4/1982 | Fed. Rep. of Germany |
| 3150152A1 | 6/1983 | Fed. Rep. of Germany |
| 3341097A1 | 5/1985 | Fed. Rep. of Germany |
| 3810174A1 | 10/1989 | Fed. Rep. of Germany |
| 3823474A1 | 1/1990 | Fed. Rep. of Germany |
| 2085524 | 9/1982 | United Kingdom |

*Primary Examiner*—Noah P. Kamen
*Attorney, Agent, or Firm*—Foley & Lardner

[57] ABSTRACT

A cooling system for a vehicle having an internal-combustion engine has a plurality of cooling circuits with heat exchangers for each circuit. The temperatures of different cooling media are measured and processed in a switching device to form an output signal which serves to control a fan. In this way, the air flow through the heat exchangers can be varied depending on measured temperature conditions. Individual capacity control of each cooling circuit is possible, thereby preventing unfavorable operating conditions in the individual circuits. The cooling capacity demand of the individual cooling circuits is determined by a central control unit which receives signals from temperature sensors in each circuit. The central control unit includes a microprocessor. Each cooling circuit has an actuating means for individually controlling the capacity of the relevant heat exchanger.

28 Claims, 8 Drawing Sheets

COOLING SYSTEM FOR A VEHICLE HAVING AN INTERNAL-COMBUSTION ENGINE

BACKGROUND OF THE INVENTION

The invention relates generally to a cooling system for vehicles having an internal-combustion engine, and particularly to a cooling system having a plurality of cooling circuits.

European Patent 0,156,078 discloses a cooling system having a plurality of cooling circuits, which has a heat exchanger for the engine coolant, the engine oil and the charge air, in each case. These heat exchangers are arranged such that a common radiator-fan ensures that the radiators are adequately charged on the air side. Moreover, a switching device is provided which, depending on different measurement signals from temperature sensors, activates actuating means which act on a hydrostatic drive of the radiator-fan.

However, the known arrangement has the disadvantage that for all cooling circuits the heat exchanger capacity is always in line with the maximum demand of one of the cooling circuits, and this can lead in turn to unfavorable temperatures or operating conditions in the remaining cooling circuits.

SUMMARY OF THE INVENTION

It is therefore the object of the present invention to provide a cooling system for vehicles having an internal-combustion engine in which, depending on a multiplicity of measured state variables, in particular the operating temperatures, individual capacity control of each cooling circuit is possible, taking into account, however, the total system.

This object is achieved in a cooling system having a plurality of cooling circuits, with each circuit having a respective heat exchanger. The cooling system includes a first cooling circuit for cooling engine coolant, the first cooling circuit including a first heat exchanger; a second cooling circuit for cooling engine oil, the second cooling circuit including a second heat exchanger; a third cooling circuit for cooling charge air, the third cooling circuit including a third heat exchanger; temperature sensors arranged in the respective cooling circuits for measuring temperatures in the circuits; actuating means arranged in the respective cooling circuits for controlling cooling capacities of respective heat exchangers; an electric switching device including an input side that is connected to the temperature sensors and an output side that is connected to the actuating means; and a central control unit, including at least one microprocessor, for determining cooling capacity requirements of the respective heat exchangers from the temperatures measured by the temperature sensors. A fourth cooling circuit having a fourth heat exchanger can also be provided for cooling the transmission oil.

A preferred development of the subject-matter of the invention consists in that speed-controlled pumps are provided as actuating means for liquid media and speed-controlled fans are provided as actuating means for the cooling air. It is possible with the use of speed-controlled pumps to control the respective flow rate of the heat exchanger fluid through the heat exchanger, but it is not sensible to arrange a pump at all the points of a fluid circuit. It is therefore likewise possible to provide an electrically controllable valve as an actuating means.

As long as an operating medium does not overshoot a specific temperature, it is not sensible to start cooling in most cases, on the contrary it can even be expedient to heat up in the starting phase. It is therefore advantageous that apart from the radiator for the engine coolant at least one further heat exchanger also has a valve-controlled bypass. It is proposed for the purpose of optimal control of a cooling circuit that the cooling circuit is fitted with a speed-controlled pump and a valve-controlled bypass.

The suppression of the cooling in the warming-up phase can also be achieved by cutting off the fluid throughput by switching off the pump or closing the valves in the relevant line.

It is known that the temperature profile inside an engine varies considerably, because the temperature peak occurs in the cylinder head whereas the engine block is exposed to a substantially lower temperature. It is therefore proposed that a separate coolant inlet and coolant outlet are provided for the engine block and the cylinder head, in each case, and at least one of these coolant connections can be restricted or cut off by means of a valve.

The heat exchangers for the engine oil, the charge air, or the transmission oil can be air-charged, and this signifies the lowest outlay on these cooling circuits. More favorable temperature characteristics, and a differentiated control of the respective cooling circuits, in particular with regard to the different material flows, can be achieved, however, when an intermediate heat exchanger that is charged with an intermediate heat-carrying medium is inserted into the cooling circuits for the engine oil and/or the charge air and/or the transmission oil. By means of appropriate connecting lines and valves, it is possible during the warming-up phase of the internal-combustion engine for the intermediate heat-carrying circuit to be connected to the coolant circuit, so that an already higher temperature level can be used in the main cooling circuit for quicker heating of the further fluids, which is the case particularly when an exhaust gas heat exchanger and/or heat accumulator is contained in the total system. In order to be able to operate the circuits of the intermediate heat exchangers independently of the main cooling circuit, it is advantageous that additional pumps having valves, or speed-controlled pumps, are provided in the coolant connecting lines of the intermediate heat exchangers.

When the internal-combustion engine is operated below its operating temperature, the heat contained in the exhaust gas can be recovered for quicker heating and thus accelerated achievement of the operating temperature occurs. This happens because an exhaust gas heat exchanger that indirectly feeds the heat extracted from the exhaust gas to the coolant circuit of the internal-combustion engine is arranged in the exhaust gas line of the internal-combustion engine. In the case of indirect heat transfer, the exhaust gas heat exchanger is charged on the secondary side by an air flow generated by means of a blower and which is fed in turn via a heat exchanger through which the coolant of the engine cooling circuit flows.

The thermal energy contained in the coolant is used for vehicle heating in a manner known per se. According to an advantageous development of the subject-matter of the invention, not only a capacity-controlled heater, but moreover a heat accumulator are connected to the engine cooling circuit, it being possible for this heat accumulator to be connected in series to the heater or to be entirely shut off. In this way, thermal energy that is otherwise dissipated in the radiator as energy loss can be stored, at least within the limits of a predetermined quantity which is then available on recall when required and serves the purpose of accelerated heating of the interior or of the internal-combustion engine.

Moreover, additional heating devices for auxiliary units, for example heaters for the cleaning water of a screen washing system, can be connected to the coolant circuit. It is likewise possible to provide coolant lines that can be shut off for the purpose of cooling auxiliary units, for example water-cooled generators. In order to control the air flow rate through the heat exchangers charged with cooling air, it is expedient to assign at least one speed-controlled fan to these heat exchangers. The drive of this fan can be performed, for example, by means of an electric motor, a liquid friction clutch or a hydrostatic drive.

At very low ambient temperatures, the quantity of air passing through the heat exchanger because of the dynamic pressure can possibly be too large, and so it is expedient to arrange in the air flow path a louver which can be controlled depending on output signals of the central control unit. In order to reduce the intensity with which the heat exchangers exposed to the air flow are charged with air, it is advantageous to provide at least one heat exchanger with a controllable air path selector. At low air flow rates through the heat exchangers, the charging of some units, for example turbocharger, generator or cylinder head, with air can be insufficient, particularly in enclosed internal-combustion engines. In such arrangements of internal-combustion engines, it is expedient when a separate air guiding duct is provided for selectively charging specific units in the engine compartment with cooling air.

BRIEF DESCRIPTION OF THE DRAWINGS

Exemplary embodiments of the cooling system according to the invention are explained in more detail below with reference to the drawings, wherein.

DETAILED DESCRIPTION OF THE PREFERRED EMBODIMENTS

Figure 1:
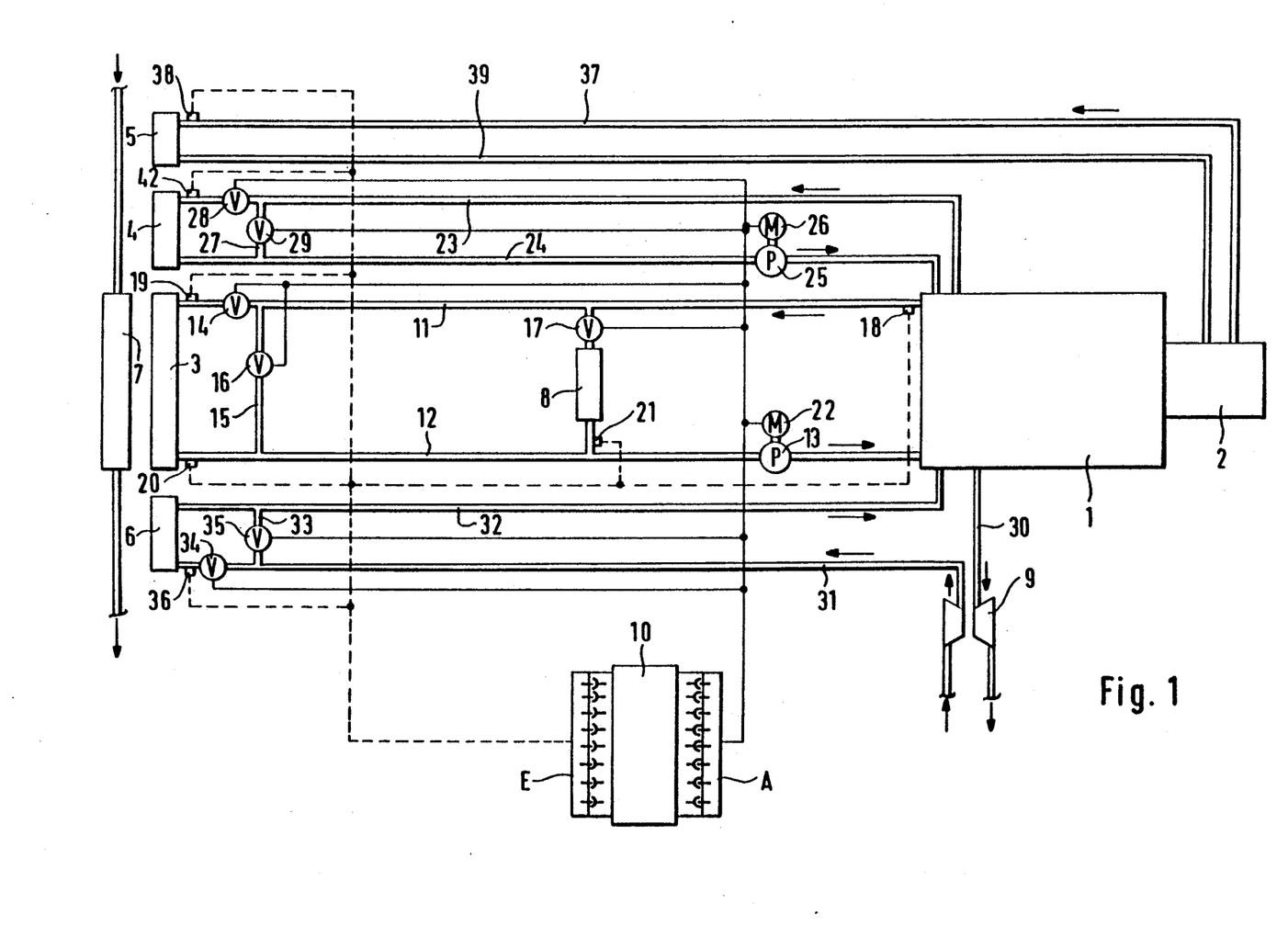
FIG. 1 shows a first embodiment of the cooling system having four separate cooling circuits.

FIG. 1 shows an internal-combustion engine 1 with a transmission 2 mounted thereon. A coolant line 11 leads from the internal-combustion engine 1 to a heat exchanger 3 which is embodied as a coolant/air heat exchanger. The outlet connection of the heat exchanger 3 is connected via a coolant line 12 to the internal-combustion engine 1, a speed-controlled water pump 13 being connected into this coolant line. Connected into the coolant line 11 before the inlet connection of the heat exchanger 3 is a valve 14 before which—seen in the coolant flow direction—a bypass line, into which a valve 16 is likewise connected, branches off. The coolant flow through the heat exchanger 3 or the bypass line 15 can be influenced with the aid of the valves 14 and 16.

Moreover, connected to the coolant lines 11 and 12 is a heater 8 for a vehicle heating system, which heater is provided with a valve 17 for controlling the quantity of coolant with which the heater is charged. A temperature sensor 18 is arranged in the immediate vicinity of the outlet connection for the coolant on the internal-combustion engine 1; a further temperature sensor 19 is located on the inlet connection of the heat exchanger 3, and a further temperature sensor 20 is provided on the outlet connection of the heat exchanger 3. According to the representation in FIG. 1, the heater 8 is also assigned a temperature sensor 21 which, like the temperature sensors 18 to 20, is connected via electrical connecting leads to the input terminals E of a central control unit 10. The valves 14, 16 and 17 are fitted, for example, with an electromechanical drive and are controlled by the central control unit 10, to whose output terminals A they are connected via electrical leads. Likewise connected to the output terminals A of the central control unit 10 is an actuating element for setting the speed of the water pump 13. This actuating element can be an electrical drive motor 22 for example.

The oil for lubricating the internal-combustion engine 1 is led through an oil line 23 to the inlet connection of an oil cooler 4, which is embodied as an oil/air cooler, from whose outlet connection an oil line 24 leads back to the internal-combustion engine 1. In order to generate an appropriate oil flow, an oil pump 25 which is driven by an electric motor 26 is provided in the oil line 24. The oil cooler 4 is provided with a bypass 27 and with valves 28 and 29, so that if required the quantity of oil that flows through the oil cooler 4 or the bypass 27 can be controlled. This is performed essentially depending on a temperature sensor 42 which is arranged on the inlet connection of the oil cooler 4. As may be seen from FIG. 1, the valves 28 and 29 and the electric motor 26 are connected to the output terminals A, and the temperature sensor 42 is connected to the input terminals E, of the central control unit 10.

An exhaust gas turbocharger 9 is connected via an exhaust gas line 30 to the internal-combustion engine 1. The air fed to the internal-combustion engine 1 is compressed in the exhaust gas turbocharger and fed via a charge air line 31 to a charge air cooler 6. A line 32 leads to the internal-combustion engine 1 from the charge air cooler 6, which is embodied as a charge-air-/air heat exchanger. Furthermore, a bypass which bypasses the charge air cooler 6 is provided with corresponding valves 34 and 35 for respectively controlling the air through the charge air cooler 6 and the bypass 33. A temperature sensor 36 is arranged in the immediate vicinity of the charge air cooler 6 and connected to the input terminals E of the central control unit 10. The valves 34 and 35 are provided with actuating means such as have already been described with reference to the valves 16 and 17, and are connected to the output terminals A of the central control unit 10.

A transmission oil line 37 leads from the transmission 2 to a heat exchanger 5 which is constructed as an oil/air cooler. Arranged on the transmission oil line 37 in the immediate vicinity of the heat exchanger 5 is a temperature sensor 38 which is connected to the input terminals E of the central control unit 10. A second transmission oil line 39 leads back from the heat exchanger 5 to the transmission 2.

FIG. 1 further shows a condenser 7 of a refrigerant circuit for a motor vehicle air conditioner, such a condenser 7 normally forming a constructional unit with the heat exchanger 3 for the coolant of the internal-combustion engine 1. The heat exchangers 4, 5 and 6 are likewise arranged in the immediate vicinity of the heat exchanger 3, and this frequently appears to be expedient for reasons of guiding the cooling air. However, such a spatial arrangement is not mandatory, and can be varied depending on the design of the vehicle.

Figure 2:
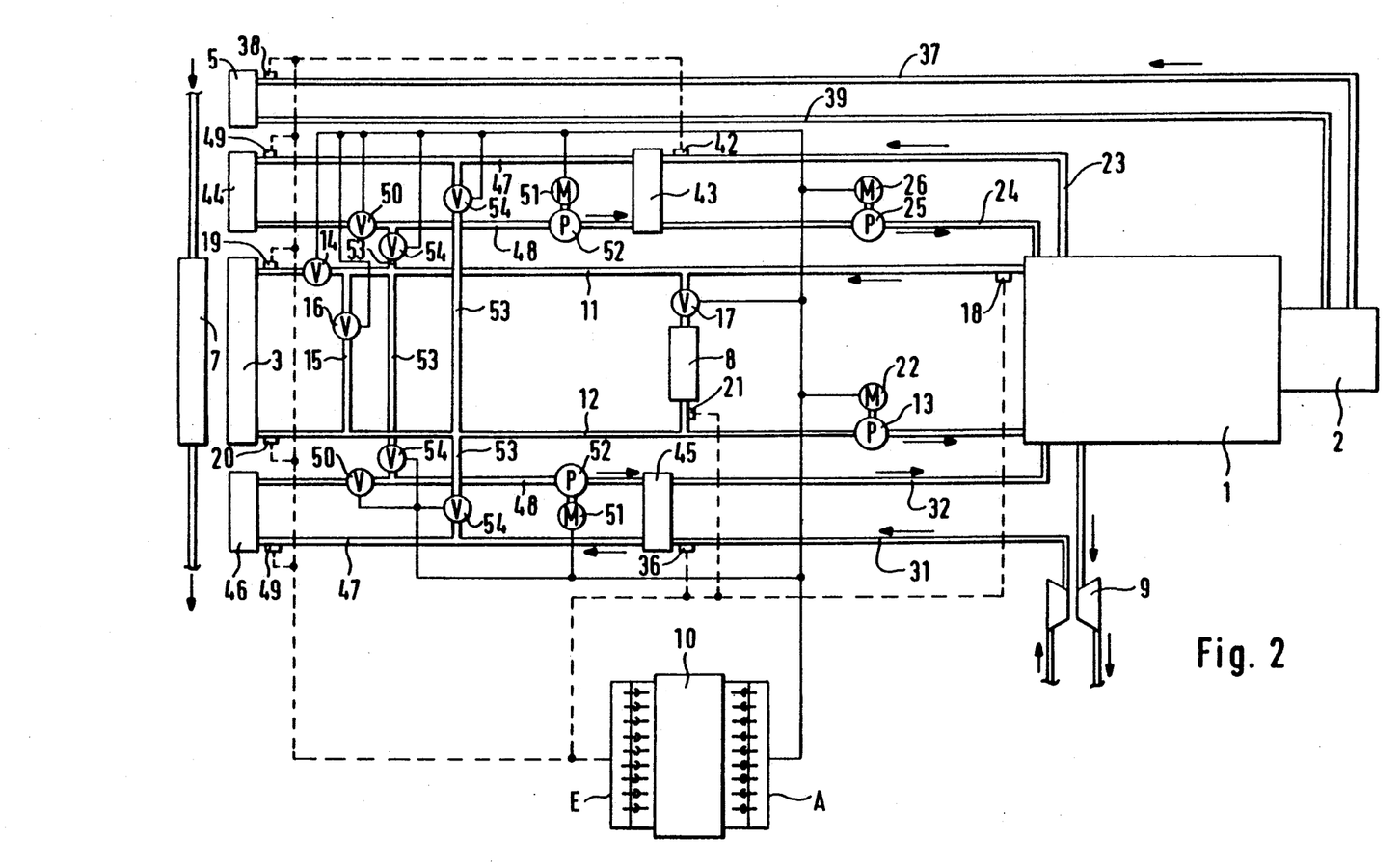
FIG. 2 shows a second embodiment having intermediate heat exchangers.

FIG. 2 represents a cooling system which partially corresponds to that described in FIG. 1. The reference symbols for the same parts of the cooling system are likewise the same, and so only the different embodiments of the already described cooling system will be discussed below. As may be seen from FIG. 2, there is connected to the oil lines 23 and 24 of the cooling circuit for the engine oil an intermediate heat exchanger 43 which is charged on the other side with a coolant. The intermediate heat exchanger 43 is connected via coolant lines 47 and 48 to an additional heat exchanger 44, a temperature sensor 49 being assigned adjacent to the additional heat exchanger 44, and there being provided in the coolant line 48 a valve 50 and a pump 52 driven by a motor 51. The coolant lines 47 and 48 are connected to the coolant lines 11 and 12 of the main cooling circuit via connecting lines 53 which can be shut off by means of valves 54.

Connected to the charge air 31 and the connecting line 32 is an intermediate heat exchanger 45 which is charged in turn on the other side with coolant. This intermediate heat exchanger 45 is connected to an additional heat exchanger 46 in the same way as the already described intermediate heat exchanger 43 is connected to the additional heat exchanger 44 assigned thereto, that is to say there are also located between the intermediate heat exchanger 45 and the additional heat exchanger 46 coolant lines 47 and 48, a temperature sensor 49, a valve 50 and a pump 52 provided with a motor 51. Moreover, connecting lines 53 with shut-off valves 54 are provided. Owing to the arrangement of the valves 50 and 54, the coolant circuit between the heat exchangers 43 and 44 or 45 and 46 can be operated separately or be connected to the main cooling circuit of the internal-combustion engine 1. The control of the respective valves 50 and 54, and the setting of the capacity of the pumps 52 is therefore performed depending on the current temperature values measured by the temperature sensors 19, 36, 42 and 49.

Figure 3:
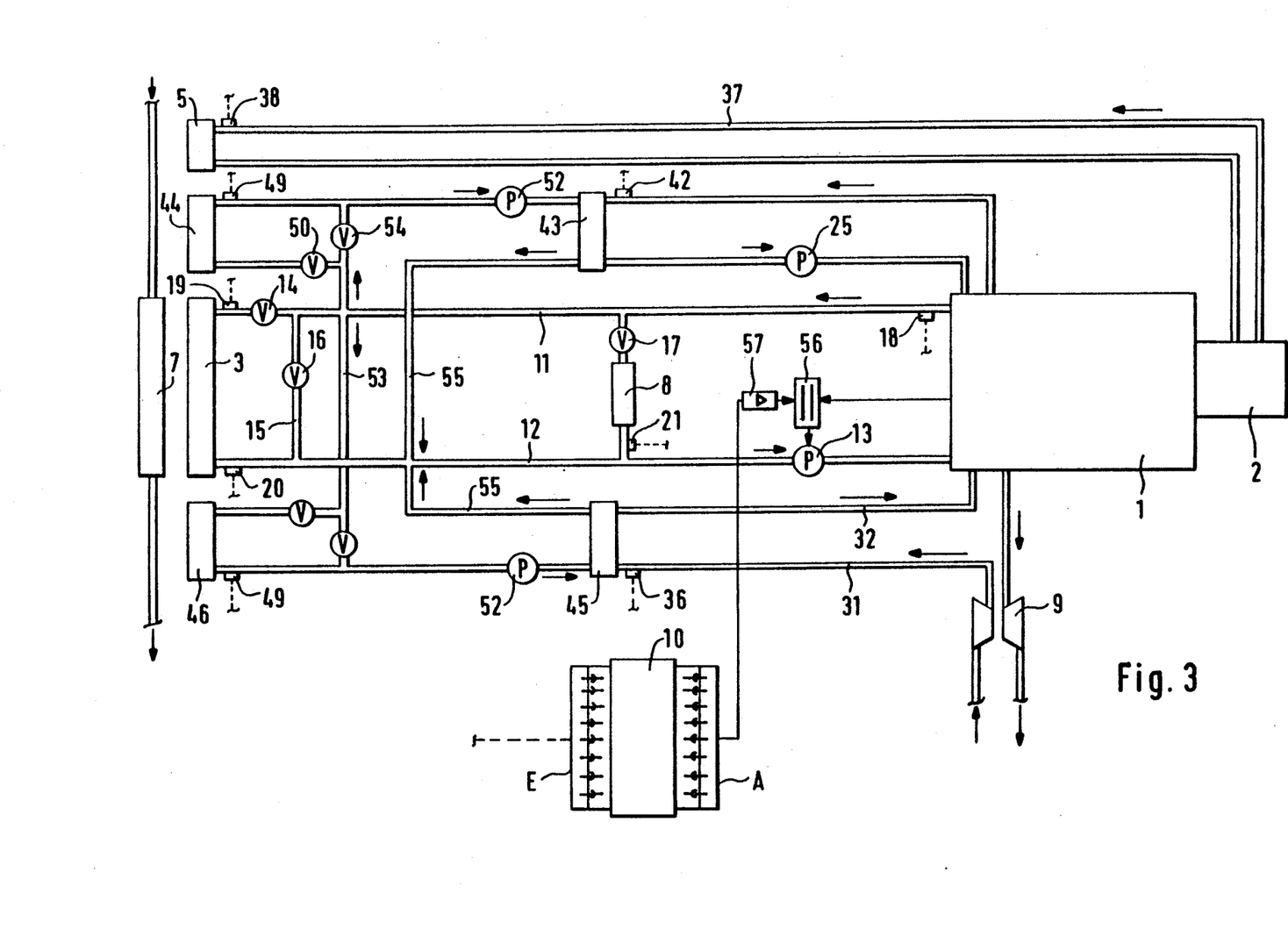
FIG. 3 shows a variant embodiment to FIG. 2.

FIG. 3 shows a variant embodiment to FIG. 2, in which the intermediate heat exchangers 43 and 45 each have a coolant line 55, through which they are permanently connected to the main cooling circuit of the internal-combustion engine. The flow of coolant through the additional heat exchangers 44 and 46 and the intermediate heat exchangers 43 and 45 can be controlled by means of the valves 50 and 54. To the extent that the water pump 13 of the coolant circuit cannot meet the cooling capacity demand for the intermediate heat exchangers 43 and 45 in all operating conditions, the connecting lines 48 can be fitted with coolant pumps 52. As an alternative to the already described electric motor drives of the water pump 13, FIG. 3 shows that the pump drive can also be performed by the internal-combustion engine 1, there being connected between the drive shaft of the internal-combustion engine 1 and the water pump 13 a speed-controlled clutch 56 which is operated by a power amplifier 57 depending on the output signals of the control unit 10.

Figure 4:
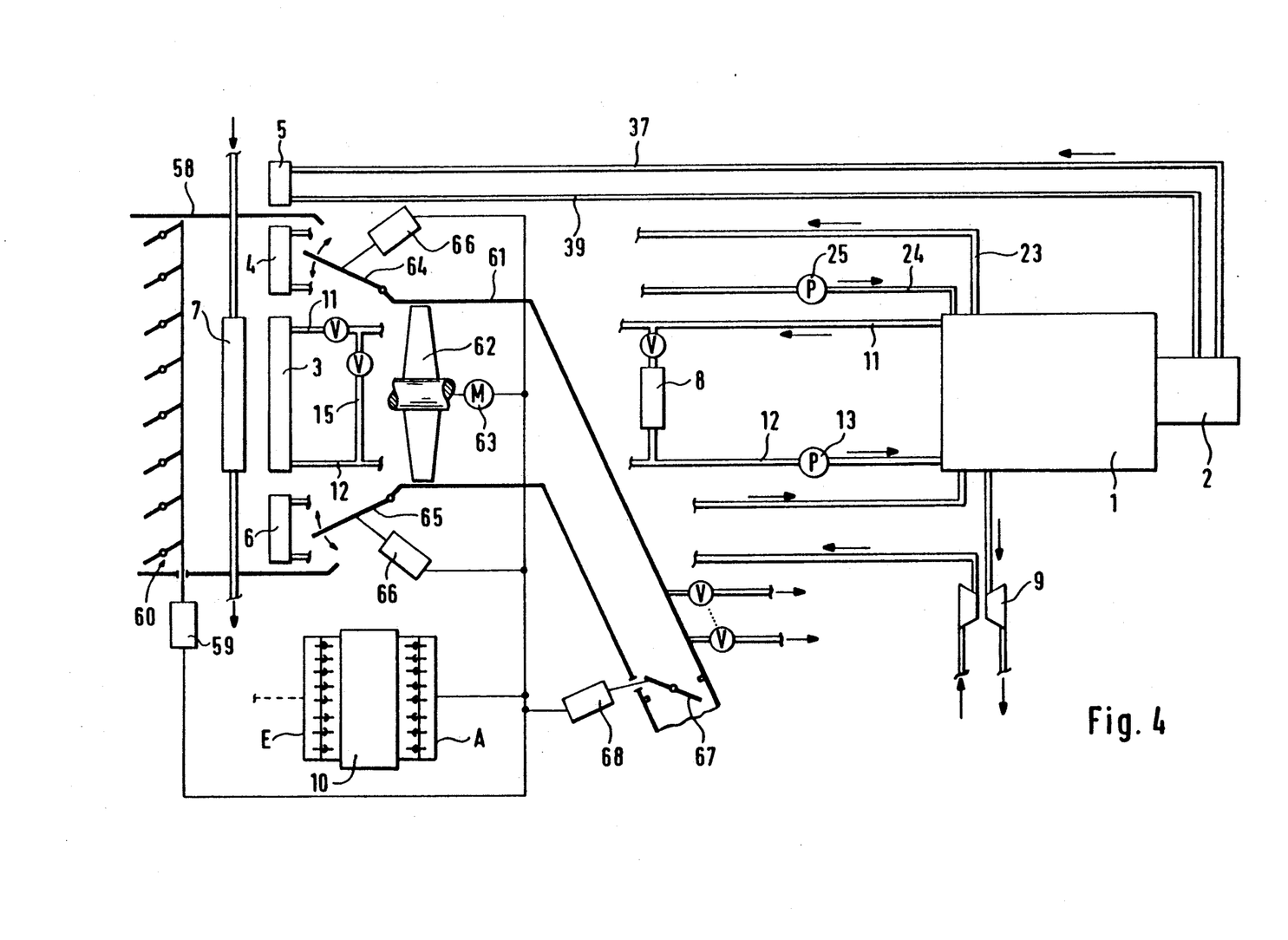
FIG. 4 shows the representation of a cooling system having air guiding means and control means.

FIG. 4 shows a cooling system according to FIG. 1 with the associated air guiding means and control means. The reference symbols for the same components correspond in each case to those of FIG. 1. It may be seen from FIG. 4 that there is provided a first frame 58, which surrounds the condenser 7 and the heat exchangers 3, 4 and 6 and on which there is mounted on the inlet side a louver 60 which can be actuated by an actuator 59. Located behind the heat exchanger arrangement 3, 4 and 6 seen in the air flow direction is a second frame 61 which surrounds a speed-controlled fan 62 having a drive motor 63. Provided in a transitional region between the heat exchanger arrangement 3, 4, 6 and the second frame 61 are two pivotable flaps 64 and 65 which can be actuated in each case by an actuator 66 and serve as an adjustable air guiding element. The fan capacity provided can exclusively benefit the condenser 7 and the heat exchanger 3 when, for example, no capacity is required for cooling the engine oil or the charge air, or the dynamic pressure suffices for this purpose.

It is possible, furthermore, for air guiding ducts connected to additional cooling devices also to be connected downstream of the fan 62, if required. Moreover, it is possible for the cooling air flow to be controlled or shut off on the output side, for which purpose a flap 67 that can be actuated by an actuator 68 is provided. The actuators 59, 66 and 68 are preferably electric stepper motors or control magnets which are connected to the outputs of the central control unit 10 with the interposition of power amplifiers.

Figure 5:
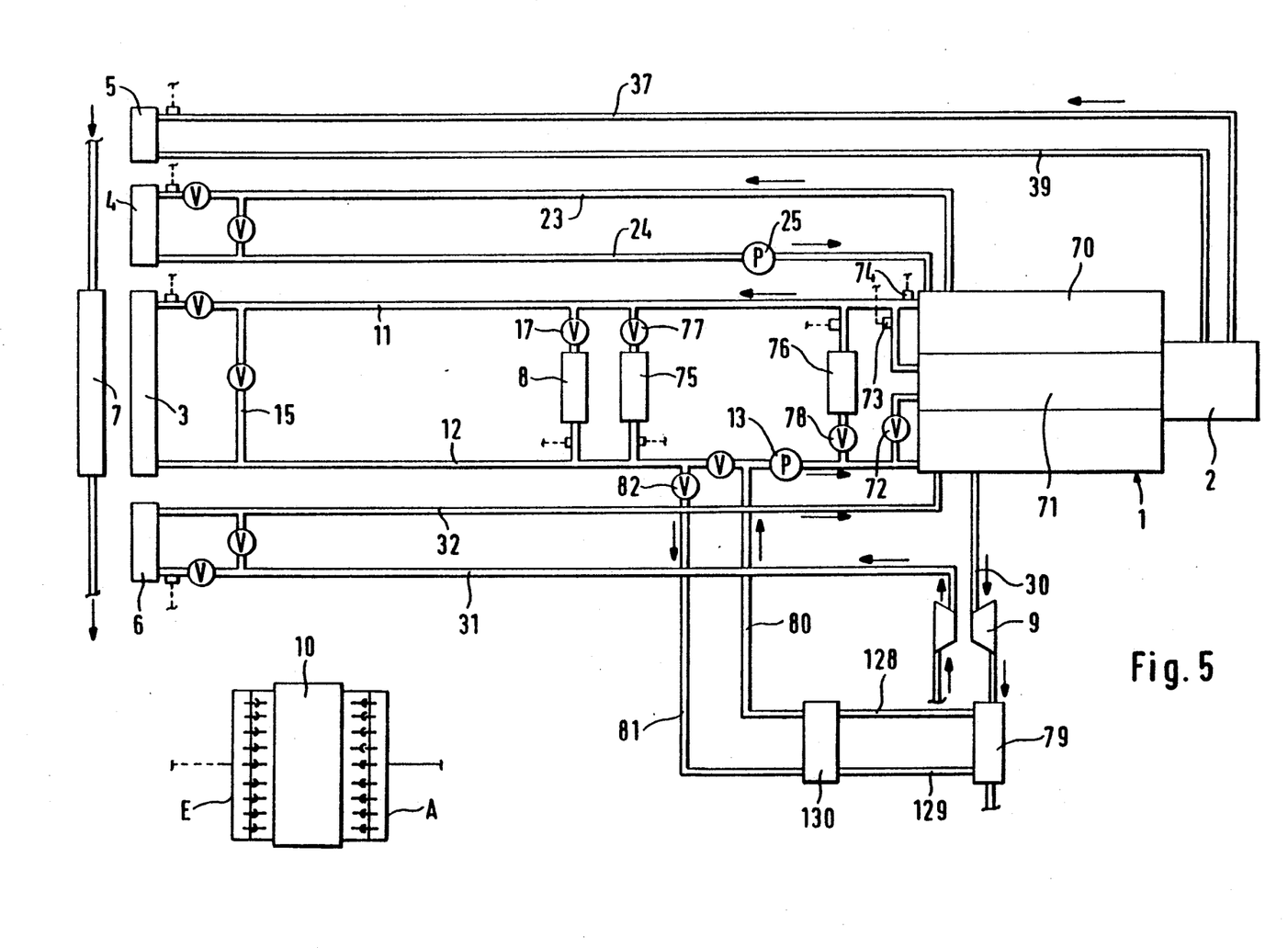
FIG. 5 shows a cooling system having an extended coolant circuit.

Represented in FIG. 5 is a cooling system in which the internal-combustion engine is sub-divided with respect to the through-flow of its coolant into two separate sub-flows, that is, into a flow for the engine block 70, on the one hand, and into a sub-flow for the cylinder head 71, on the other hand. The forking of these two sub-flows can take place immediately in front of the connection of the coolant line 12 on the internal-combustion engine 1, valve means 72 being provided in the connections for the sub-flows. The output temperatures of the coolant of the two sub-flows are measured separately by temperature sensors 73 and 74.

Moreover, in FIG. 5 coolant branches are further provided for additional heaters 75 and additional cooling devices 76. These additional heaters 75 and additional cooling devices 76 are arranged parallel in terms of flow to the heat exchanger 3 or the heater 8, and can be controlled in each case via valves 77 and 78, respectively.

The exhaust gas flow leaving the turbocharger 9 is led through a heat exchanger 79 which is charged on the secondary side with an intermediate heat-carrying fluid which circulates through connecting lines 128 and 129 and a heat exchanger 130. Connecting lines 80 and 81 serve to connect the heat exchanger 130 to the main cooling circuit, a valve 82 being inserted into the connecting line 81 in order to control the heat transfer capacity in the heat exchanger 130. It is possible with the aid of the heat exchanger 79 arranged in the exhaust gas flow to shorten the period of time required to achieve the operating temperature of the internal-combustion engine 1.

Figure 6:
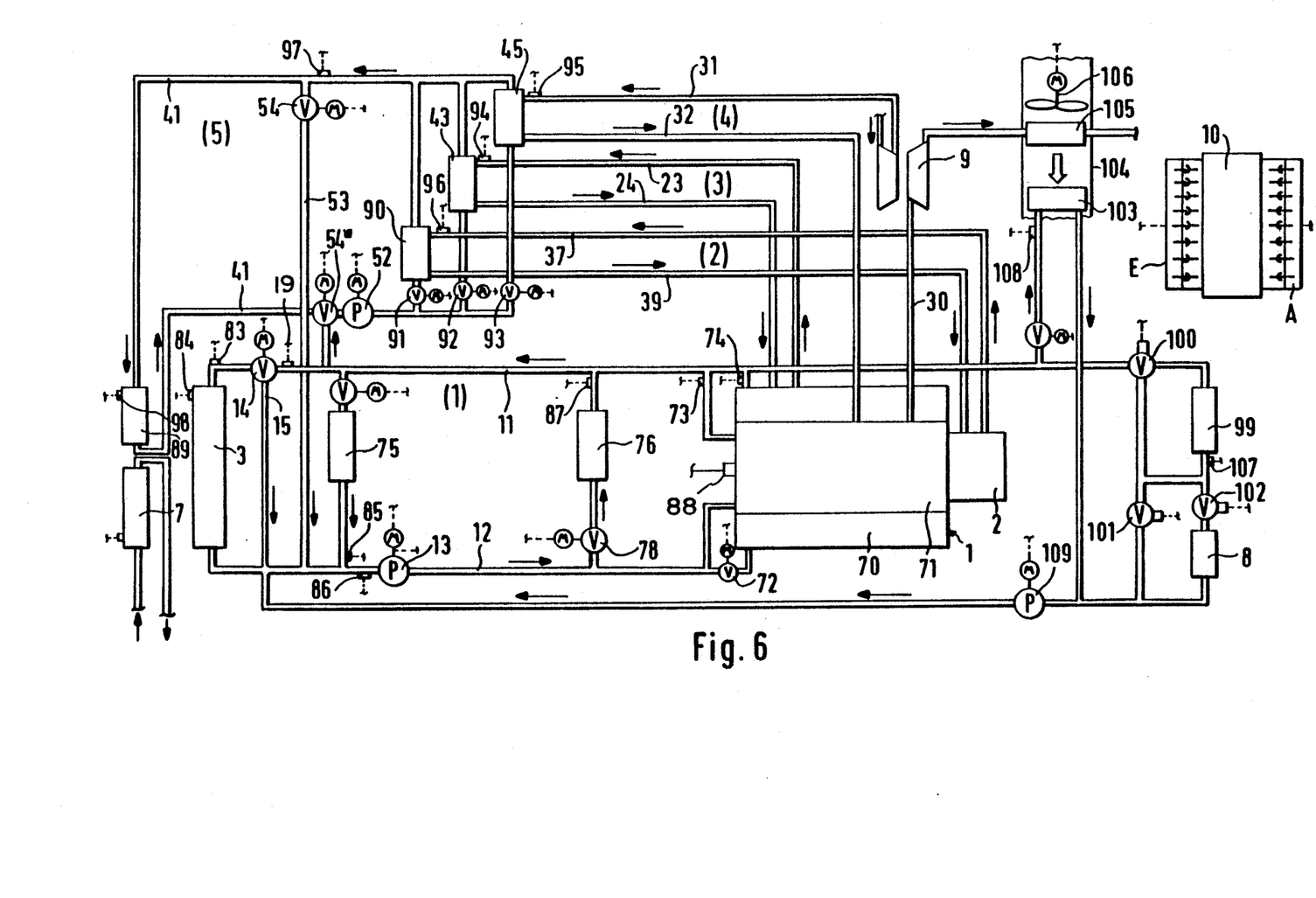
FIG. 6 shows a variant embodiment in which all the cooling circuits are connected to the coolant of the internal-combustion engine.

In FIG. 6, the internal-combustion engine is provided with coolant lines connected in parallel for the cylinder head 71 and the engine block 70. The valve means 72 is arranged in the feed line for the engine block 70, and the temperature sensors 73 and 74 are provided at the outlets of the respective lines. The main cooling circuit comprises the heat exchanger 3, the bypass 15, and additional heating devices 75 and additional cooling devices 76 for auxiliary units. The charging of the individual branches, or the flow rate of the coolant is controlled by valves 14, 72, 77 and 78. A plurality of temperature sensors 19, 73, 74, and 85 to 87 are provided at different points of the cooling circuit of the heat exchanger 3 and of the internal-combustion engine 1 in order to measure the coolant and air temperatures, and a pressure sensor 83, a level sensor 84 or 98 and a speed sensor 88 are provided for the purpose of measuring further parameters, all of which are connected to the input terminals of the central control unit 10.

A secondary coolant circuit, which comprises an additional heat exchanger 89, constructed as coolant/air cooler, and three intermediate heat exchangers 43, 45 and 90, is connected to the main cooling circuit via connecting lines 53. Provided in the line system 41 of the secondary coolant circuit is a pump 52, which is driven by an electric motor 40 and with regard to its conveying capacity can have a constant, or else a variable volume and/or speed. In terms of flow, the three intermediate heat exchangers 43, 45 and 90 are connected in parallel in each case and can be individually controlled with respect to their heat transfer capacity by means of separate valves 91, 92 and 93.

The intermediate heat exchanger 43 serves to cool the engine oil, and it is connected to the engine block 70 by means of oil lines 23 and 25. The oil pump integrated in the internal-combustion engine 1 is fully sufficient to circulate the oil through the oil lines 23 and 24 and the intermediate heat exchanger 43, so that an additional pump is unnecessary. The reference symbol 94 denotes the temperature sensor for the oil inlet temperature at the intermediate heat exchanger 43. Leading to the turbocharger 9 from the internal-combustion engine 1 is an exhaust gas line 30. The turbocharger 9 conveys fresh air through the charge air line 31 to the intermediate heat exchanger 45. Provided at the inlet of the intermediate heat exchanger 45 is a temperature sensor 95 which measures the inlet temperature of the charge air into the intermediate heat exchanger 45. Adjoining this intermediate heat exchanger 45 is a connecting line 32 which leads to the internal-combustion engine 1. The intermediate heat exchanger 90 serves to cool the transmission oil, and it is connected for this purpose to the transmission 2 via transmission oil lines 37 and 39. A temperature sensor 96 is provided on the inlet side of the intermediate heat exchanger 90 in order to measure the temperature of the transmission oil.

A further temperature sensor 97 is provided before the fork in the connecting line 53. Connected into the connecting line 53 is a valve 54 which, given specific criteria, clears the connection between the main coolant circuit and the second coolant circuit. The valve 54 works in tune with a valve 54., so that there is communication between the two coolant circuits under special operating conditions. Such operating conditions occur, in particular, in the case of a cold internal-combustion engine 1, that is to say in the starting phase of the machine. The aim of the connecting lines 53 is to ensure that a quick temperature rise in the main coolant circuit, for example when the latter is fitted with an exhaust gas heat exchanger 105 or with a heat accumulator 99, can be rendered useful for the second coolant circuit, as well. Upon overshooting of specific temperatures or temperature differences, the valves 54 and 54* are closed. The additional heat exchanger 89 is fitted with a level sensor 98.

Connected to the main cooling circuit is a heating circuit of a motor vehicle heating system, which apart from the heater 8 also comprises a heat accumulator 99. The heat accumulator 99 is connected in such a way and provided with valve means such that it can be operated in series with the heater 8 or shutoff. Of course, the valve means 100, 101 and 102 also permit the flow of the coolant through the heating system to be completely shut off.

Moreover, there is connected to the heating circuit a further heat exchanger 103 which is arranged together with an exhaust gas heat exchanger 105 in an air guiding duct 104. A blower 106 generates an air flow through the exhaust gas heat exchanger 105, which extracts the heat from the exhaust gas in order subsequently to release the heat to the coolant flowing through the heat exchanger 103. The reference symbols 107 and 108 designate temperature sensors in the heating circuit. A pump 109 is provided in order to ensure sufficient circulation of the coolant in the heating circuit.

As FIG. 6 shows, all the actuating means, that is, pumps, fan and the like, are provided with electrical actuating means or drives, which are all controlled by the central control unit 10 in accordance with the respectively measured temperature values and the capacity demand calculated therefrom.

Figure 7:
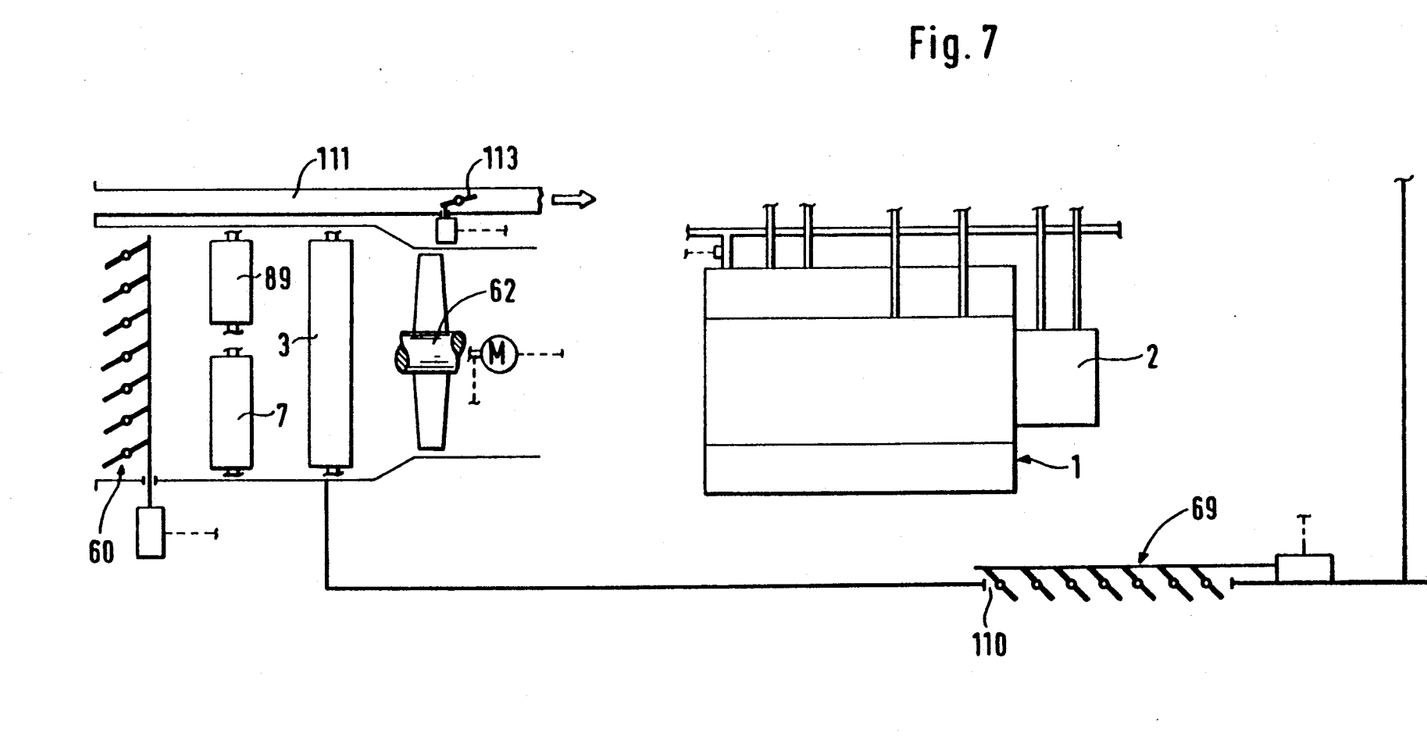
FIG. 7 shows an arrangement for guiding air in the engine compartment.

FIG. 7 shows an arrangement for guiding cooling air with the participation of the engine compartment, the cooling air passing through the opened louver 60 to the condenser 7, the additional heat exchanger 89, and the heat exchanger 3 for the coolant of the internal-combustion engine 1. Downstream of the fan 62, the cooling air passes through the engine compartment and can escape to the ambient air at an opening 110 that can be controlled by means of a louver 69. Depending on what is required, the opening 110 is partially or completely closed by the louver 69. Moreover, FIG. 7 shows the arrangement of a separate fresh air duct through which, irrespective of the heat exchanger arrangement, fresh air can flow into the engine compartment, it being possible for this fresh air to be fed to specific units, such as the cylinder head, the turbocharger or the generator. A flap 113 driven by a control magnet is arranged in this additional air guiding duct 111.

Figure 8:
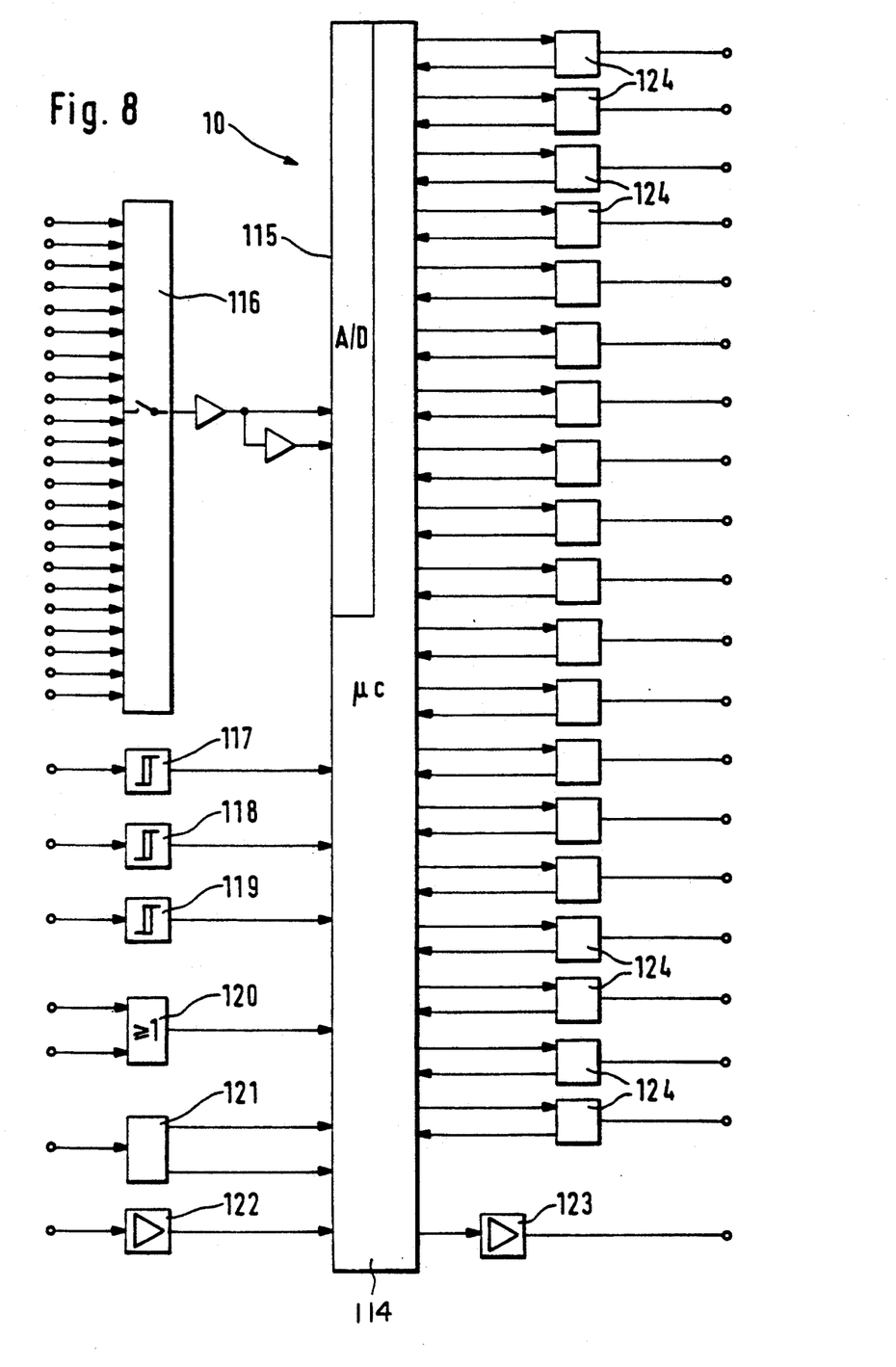
FIG. 8 shows an electronic control unit with examples of the occupancy of input and output terminals.

FIG. 8 represents a block diagram of the central control unit 10 with examples of possible input parameters and controllable actuating means. The central control unit 10 comprises a microprocessor 114 and an analogue-to-digital converter 115, before whose input a multiplexer 116 is connected. This multiplexer has a multiplicity of inputs, which are connected to the temperature sensors specified in FIGS. 1 to 6. These are the temperature sensors for the coolant leaving the engine block, for the coolant leaving the cylinder head, the coolant upon entry into the heat exchanger 3, the temperature of the coolant in the branch of the additional heaters, the temperature of the coolant in the branch of the cooling devices of auxiliary units, the temperature in the heat accumulator, the temperature of the engine oil, the charge air, and the transmission oil, as well as, if required, the temperature of the intermediate heat-carrying medium. Moreover, the multiplexer 116 is fed the pressure of the coolant at the input of the heat exchanger 3 and the value of the level sensors.

The speed of the fans, the speed of the water pump 13 and the speed of the internal-combustion engine 1 are fed to the central control unit 10 via comparators 117, 118 and 119, which change their output signal upon overshooting of a specific threshold value. It is established at one input 120 whether ignition or a specific state of the central locking has been switched on, and this leads to activation of the heat accumulator with a view to releasing the heat content. The battery voltage is applied via the switching device 121 to the central control unit 10. A test signal input amplifier 122 is provided for a test function. An output amplifier 123 is present for the corresponding diagnosis signal.

The outputs of the central control unit 10 are connected to driver stages (power amplifiers), which are provided in each case with a feedback line for reporting the proper functioning of the respective driver stage. All the driver stages in FIG. 8 have the reference symbol 124; however, they serve different actuation purposes, for example setting the louvers, setting the valves of the different cooling circuits, for example coolant cooler, heater, charge air, engine oil, transmission oil, and setting the respective drive speeds for the fluid pumps and blowers.

It will be appreciated that the present invention can be embodied in other specific forms without departing from the spirit or essential characteristics thereof. The presently disclosed embodiments are therefore considered in all respects to be illustrative and not restrictive. The scope of the invention is indicated by the appended claims, and all changes that come within the meaning and range of equivalence thereof are intended to be embraced therein.

What is claimed is:

1. A cooling system for vehicles having an internal-combustion engine, comprising:
    a first cooling circuit for cooling engine coolant, the first cooling circuit including a first heat exchanger;
    a second cooling circuit for cooling engine oil, the second cooling circuit including a second heat exchanger;
    a third cooling circuit for cooling charge air, the third cooling circuit including a third heat exchanger;
    temperature sensors arranged in the respective cooling circuits for measuring temperatures in the circuits;
    actuating means arranged in the respective cooling circuits for controlling cooling capacities of respective heat exchangers;
    an electric switching device including an input side that is connected to the temperature sensors and an output side that is connected to the actuating means; and
    a central control unit, including at least one microprocessor, for determining cooling capacity requirements of the respective heat exchangers from the temperatures measured by the temperature sensors and for controlling the actuating means according to the determined cooling capacity requirements.

2. The cooling system as claimed in claim 1, wherein the actuating means are speed-controlled pumps.

3. The cooling system as claimed in claim 2, wherein at least one cooling circuit includes a valve-controlled bypass line for bypassing its respective heat exchanger.

4. The cooling system as claimed in claim 1, wherein the actuating means are electrically controllable valves.

5. The cooling system as claimed in claim 4, wherein the first cooling circuit includes a valve-controlled bypass line for bypassing the first heat exchanger.

6. The cooling system as claimed in claim 5, wherein at least one of the second and third cooling circuits includes a valve-controlled bypass line for bypassing at least one of the second and third heat exchangers.

7. The cooling system as claimed in claim 1, wherein the first cooling circuit includes separate coolant inlet connections and coolant outlet connections for an engine block and a cylinder head, respectively, and wherein at least one of the coolant connections can be restricted or shut off by means of a valve.

8. The cooling system as claimed in claim 1, further comprising a fourth cooling circuit for cooling transmission oil, the fourth cooling circuit including a fourth heat exchanger.

9. The cooling system as claimed in claim 8, further comprising an intermediate heat exchanger that is charged with an intermediate heat-carrying medium and wherein the intermediate heat exchanger is inserted into at least one of the second, third, and fourth cooling circuits.

10. The cooling system as claimed in claim 9, wherein a consistency of the intermediate heat-carrying medium is substantially equal to a consistency of the engine coolant.

11. The cooling system s claimed in claim 10, wherein the first cooling circuit includes at least one of the second, third, and fourth heat exchangers adapted to be connected in parallel in terms of flow with the first heat exchanger, and valve means for connecting at least one of the second, third, and fourth heat exchangers in parallel with the first heat exchanger.

12. The cooling system as claimed in claim 11, further comprising speed-controlled pumps located in connecting lines between the intermediate heat exchanger and at least one of the second, third, and fourth heat exchangers.

13. The cooling system as claimed in claim 8, further comprising at least one speed-controlled fan for charging at least one of the heat exchangers with cooling air.

14. The cooling system as claimed in claim 13, including at least one of an electric motor, a liquid friction clutch, and a hydrostatic drive for driving the fan.

15. The cooling system as claimed in claim 14, wherein a speed of the fan is controlled by the central control unit.

16. The cooling system as claimed in claim 13, further comprising a louver, located upstream from the fan, which is controlled by the central control unit.

17. The cooling system as claimed in claim 16, further comprising a controllable air path selector for controlling air flow through at least one heat exchanger.

18. The cooling system as claimed in claim 16, further comprising closing means for closing an air flow path on the downstream side of the heat exchangers.

19. The cooling system as claimed in claim 18, further comprising a separate air guiding duct for selectively charging specific units in the engine compartment with cooling air.

20. The cooling system as claimed in claim 1, wherein at least one of the cooling circuits includes an exhaust gas heat exchanger arranged downstream of a turbocharger, in terms of exhaust gas flow, and in the exhaust gas line of the internal-combustion engine.

21. The cooling system as claimed in claim 20, wherein the exhaust gas heat exchanger is charged on a secondary side with an air flow generated by means of a blower.

22. The cooling system as claimed in claim 21, wherein the air flow is fed to a heat exchanger located in the first cooling circuit.

23. The cooling system as claimed in claim 1, wherein the first cooling circuit includes a capacity-controlled heater of a vehicle heating system and a heat accumulator, wherein the heat accumulator can be connected in series to the heater or entirely shut off.

24. The cooling system as claimed in claim 23, wherein the first cooling circuit includes heating devices for auxiliary units.

25. The cooling system as claimed in claim 1, wherein the first cooling circuit includes at least one coolant line, which line can be shut off, for cooling auxiliary units.

26. The cooling system as claimed in claim 1, further comprising at least one pressure sensor for sensing pressure in one of the cooling circuits and outputting a pressure signal to the central control unit.

27. The cooling system as claimed in claim 1, further comprising a speed sensor for sensing the speed of a crankshaft of the internal-combustion engine and outputting a speed signal to the central control unit.

28. The cooling system as claimed in claim 1, further comprising at least one level sensor for sensing a level of coolant in one of the heat exchangers and outputting a level signal to the central control unit.

* * * * *